United States Patent [19]

Sypniewski

[11] Patent Number: 4,838,620

[45] Date of Patent: Jun. 13, 1989

[54] TRACTION SYSTEM UTILIZING PUMP BACK BASED ABS SYSTEM

[75] Inventor: James M. Sypniewski, Granger, Ind.

[73] Assignee: Allied-Signal Inc., Morristown, N.J.

[21] Appl. No.: 50,654

[22] Filed: May 18, 1987

[51] Int. Cl.[4] .......................... B60T 8/40; B60T 13/70
[52] U.S. Cl. ..................................... 303/116; 180/197;
 303/10; 303/110; 303/119
[58] Field of Search ................ 180/197, 244; 303/110,
 303/116, 10–12, 113, 115, 117, 119, 61–63,
 68–69, 111, 92; 188/355–360

[56] References Cited

U.S. PATENT DOCUMENTS

| | | | |
|---|---|---|---|
| 4,354,715 | 10/1982 | Farr et al. | 303/116 |
| 4,568,131 | 2/1986 | Blomberg et al. | 303/116 X |
| 4,627,671 | 12/1986 | Matsui et al. | 303/116 |
| 4,729,611 | 3/1988 | Kircher et al. | 303/116 |
| 4,730,877 | 3/1988 | Seibert et al. | 303/116 X |
| 4,755,007 | 7/1988 | Mollat | 303/116 X |
| 4,755,008 | 7/1988 | Imoto et al. | 303/116 X |
| 4,758,054 | 7/1988 | Brown | 303/116 X |

FOREIGN PATENT DOCUMENTS

| | | |
|---|---|---|
| 3119803 | 12/1982 | Fed. Rep. of Germany . |
| 2078323 | 1/1982 | United Kingdom . |
| 2126297 | 3/1984 | United Kingdom . |

OTHER PUBLICATIONS

Patent Abstracts of Japan, vol. 10, No. 134, May 16, 1986.

Primary Examiner—Douglas C. Butler
Attorney, Agent, or Firm—Ken C. Decker

[57] ABSTRACT

The present invention relates to systems for controlling wheel spin in a motor vehicle such as an automobile, and in particular to such a system which includes a pump-back adaptive braking system and a traction control system which utilize a common pump and wheel cylinder pressure modulating valves.

10 Claims, 2 Drawing Sheets

TRACTION SYSTEM UTILIZING PUMP BACK BASED ABS SYSTEM

BACKGROUND OF THE INVENTION

The present invention relates to systems for controlling wheel spin in a motor vehicle such as an automobile, and in particular to such a system which includes a pump-back adaptive braking system and a traction control system which utilize a common pump and wheel cylinder pressure modulating valves.

Adaptive braking systems, also variously denominated anti-lock braking systems and anti-skid braking systems, are now well known. Early braking systems of this type were typically mechanical systems utilizing devices such as a momentum wheel or shifts in a vehicles suspension geometry to sense a change in the coefficient of friction between a vehicles wheel and a surface indicative of an excessive slip condition. Upon sensing such a condition, braking pressure was released or reduced to thereby avert locking of the wheel with an attendant decrease in braking distance and skids. Subsequently, such systems have been continuously developed with electronic wheel speed sensors, electronic circuitry, and high speed brake pressure modulating valves now being used to monitor and control the rotational behavior of the vehicles wheels during braking.

It is now further recognized that a vehicles braking system can also be utilized to absorb torque of the vehicles driven wheels to thereby reduce or avert spinning of the vehicles wheels during acceleration. Such systems are commonly referred to as traction control systems. Since both types of systems in effect control the amount of slip of a vehicles wheels on a road surface, a system incorporating both adaptive braking and tracion control may be and is herein denominated a wheel slip control system.

At the present time adaptive braking systems can be subdivided into two basic categories. Specifically, these include replenishment systems in which a motor driven pump provides the power boost for the braking system and also provides a source of pressurized brake fluid during adaptive braking operation and "pump-back" systems in which a motor driven pump is intermittently operated to replace braking fluid depleted from the vehicles wheel cylinder during adaptive braking operation.

Of these systems, the pump-back systems have the advantages of allowing the use of well known and highly developed vacuum boosters, potentially lower cost, and some inherent failure mode advantages. Heretofore, however, pump-back systems have had the advantage of not being readily adaptable for traction control. This is due to the absence of a source of pressurized braking fluid, typically provided by a high pressure source during adaptive braking, when the vehicle is in a non-braking mode. In view of the above enumerated advantages of pump-back systems, there exists a need for a wheel slip control system which possesses the advantages of a pump-back adaptive braking system and which simultaneously provides for traction control.

Broadly, the present invention is a wheel slip control system which comprises speed sensor means operatively connected to the wheels of a vehicle for generating a signal as a function of the rotation thereof. A control means is connected to the sensors and responsive to the rotational behavior of the wheel for generating control signals in response to wheel slip. Means including a master cylinder and at least one wheel brake cylinder are provided for applying braking force to the vehicles wheels. Brake pressure modulating means are connected in the braking circuit for automatically modulating the application of braking force to the wheels in response to the control signals and means for generating braking and traction controls signals in response to the application of braking and acceleration force to the wheel, respectively. A pump is provided and is operable in a first state to pump braking fluid from a pressurized source typically the wheel cylinder, during brake anti-skid activity, and operable in a second state to draw and pump braking fluid from an unpressurized source, typically the master cylinder reservoir. First valve means are provided and operable in response to a traction control signal for blocking communication from the wheel cylinder to the master cylinder and for providing communication therebetween in the absence of the traction control signal. A second valve means is provided for connecting the pump means to a source of unpressurized braking fluid in response to the traction control signal and blocking communication therebetween the absence of the traction control signal.

The dual operating state pump and associated first and second valve means enable the use of a common pump for both adaptive braking and traction control in a pump-back type adaptive braking system wherein the normal pump-back type of pump must not draw a vacuum to ensure proper operation of the system during adaptive braking.

It is therefore an object of the invention to provide an improved wheel slip control system.

Another object of the invention is to provide such a system wherein common elements of a pump-back adaptive braking system also function to provide traction control.

Still another object of the invention is to provide such a system incorporating a dual operating state pump operable during adaptive braking to pump pressurized fluid to restore braking fluid lost from a wheel cylinder during adaptive braking and operable in a second state to pump braking fluid from a non-pressurized source to provide a source of pressurized fluid for traction control.

Yet another object of the invention is to provide such a system which includes a pump provided with novel porting and a minimum number of additional control valves to enable a pump-back adaptive braking system to also function as a traction control system.

BRIEF DESCRIPTION OF THE DRAWINGS

These and other objects and purposes of the invention will be best understood in view of the following detailed description taken in conjunction with the appended drawings wherein.

DESCRIPTION OF THE PREFERRED EMBODIMENT

Figure 1:
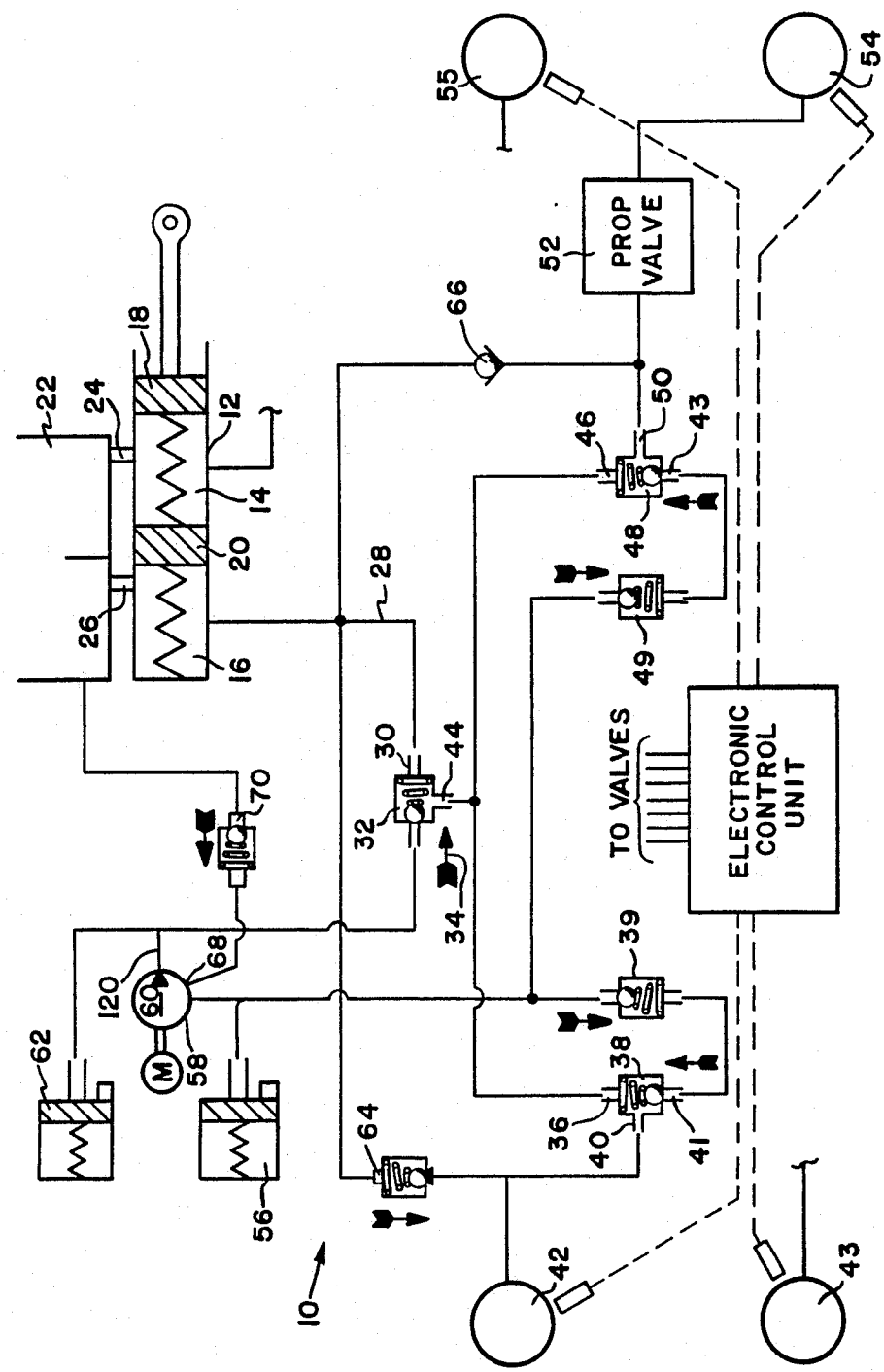
FIG. 1 is a hydraulic schematic of a wheel slip control system in accordance with the invention.

Referring now to the drawings there shown in FIG. 1 a wheel slip control system indicated generally at 10. The system includes a conventional master cylinder 12 having primary and secondary pressure chambers 14, 16 which are manually pressurized by means of primary and secondary pistons 18, 20. The master cylinder 12 is actuated by means of a pedal (not shown) and plunger 21 and may be vacuum or hydraulically boosted by conventional and well known means also not shown. A reservoir 22 supplies hydraulic brake fluid to the master cylinder 12 through replenishment ports 24, 26.

As illustrated, the system is connected in a diagonal split in figuration, that is, in a configuration wherein the front wheel 42 on one side of the vehicle and the rear wheel 54 on the opposite side of the vehicle are operatively connected to one of the primary and secondary cylinder 14, 16 and the other front and rear wheel are connected to the other of the cylinders. The two circuits are identical with the exception of their connection to the primary or secondary cylinder. Accordingly, only one of the circuits is shown for simplicity.

The output cylinder 16 is connected via conduit 28 to the normally open inlet port 30 of a 3-way isolation/build valve 32. Valve 32 is solenoid operated, is shown in its normal position, and operates in the direction of the associated arrow 34, in response to energization of its actuating solenoid (not shown). The output of valve 32 is hydraulically connected to the normally open inlet port 36 of solenoid actuated 3-way build/hold valve 38, the outlet port 40 thereof be connected to the brake wheel cylinder 42 of a front wheel 42 of the vehicle. Outlet port 44 of valve 32 is also connected to the normally open inlet port 46 of another solenoid actuated 3-way build/hold valve 48. The outlet port 50 of valve 48 is connected through a conventional proportioning valve 52 to the brake wheel cylinder of rear wheel 54 associated with a non-driven wheel of the vehicle.

Wheel cylinders controlling wheels 42, 54 are further connected backwardly through the outlet ports 40 and 50 of valves 38, thru 48 and valves 39 and 49, to a sump 56 and one inlet port 58 of a motor driven pump 60 described in detail below. The outlet of the pump 60 is connected in common to an accumulator 62 and to the cylinder 16 through valve 32. Wheel cylinder of wheel 42 is connected through a normally closed 2-way valve 64 to cylinder of wheel 16 and wheel cylinder 54 is connected through a conventional unidirectional check valve 66 to the cylinder 16. Lastly, a second inlet port 68 of pump 60 is connected through a normally closed 2-way solenoid actuated valve 70 to the reservoir 22.

The valves 32, 38, 39, 48, 49, 64, 70 and the pump 60 comprise a brake pressure modulator controlling the wheels 42 and 54. These valves are controlled by an electronic control unit 71 which processes wheel speed signals transmitted to the control unit 71 from wheel speed sensors 72A, 72B, 72C, and 72D of conventional design which generate signals representing the rotational speed of wheels 42, 43, 54, and 55 respectively.

Figure 2:
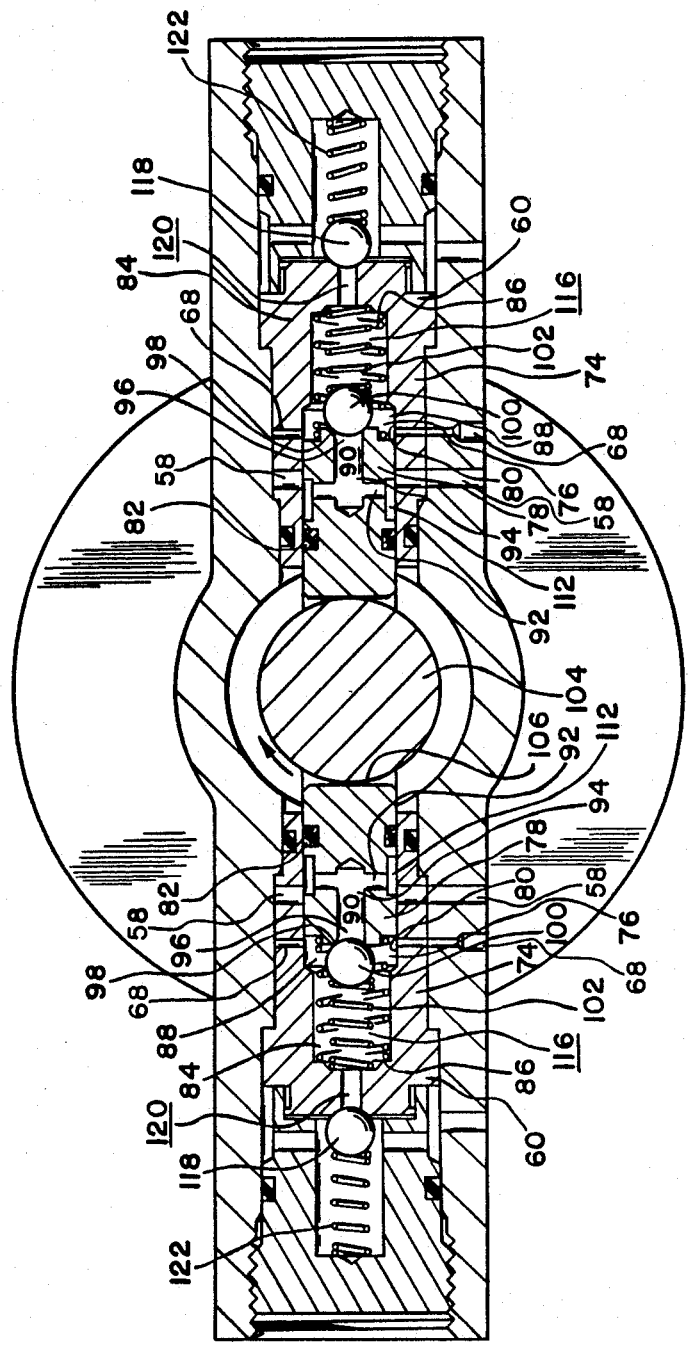
FIG. 2 is an axial sectional view of the dual operating state pump used in the invention.

Referring now to FIG. 2, there shown in axial section the internal structure of the pump 60. The pump includes a housing 74 provided with a cylindrical bore 76 of stepped diameter. A cylindrical piston 78 is reciprocally received within the larger diameter portion 80 of the bore 76. Fluid tight engagement between the piston 78 and bore portion 80 is provided by means such as seal 82. A piston spring 84 is compressed between the end 86 of bore 76 and end 88 of the piston 78 to urge same to the right (as viewed in the drawings). A fluid passage 90 comprises a laterally extending portion 92 and a cavity portion 94 communicating therewith, portion 94 having an open end 96 terminating in a chamfered surface 98 that defines a valve seat. A spherical check valve 100 is normally maintained in sealing engagement with valve seat 98 by first check valve spring 102. Reciprocating motion of the piston 78 is effected by means such as and eccentric 104 slidably engaging end 106 of the piston 78.

A primary fluid inlet passage 110 communicates with port 58 and extends through the lateral wall of housing 60 and communicates with fluid passage 90 by means of a land 112 formed in piston 78 in registry therewith in all operating position of the piston 76. A secondary fluid passage 114 communicates with port 68 and also communicates through the wall of housing 60 with the piston chamber 116 when the piston 78 is at the bottom or right (as viewed in the drawings) position thereof, passage 114 being closed by the piston 76 as it moves to the left (as viewed in the drawings). A check valve 118 unidirectionally closes a fluid outlet passage 120 of the pump, check valve 118 being maintained in position by spring 122.

During a normal braking operation, brake fluid in reservoir 22 fills chambers 14, 16. When the brake pedal is operated, pistons 18, 20 close the replenishment orifices 24, 26 and generate pressurized fluid in the chambers 14, 16. Pressurized fluid in chamber 16 is applied to the secondary circuit while pressurized fluid in chamber 14 is applied to the primary circuit. The pressurized fluid passes via conduit 28 through the normally open 3-way valve 32 to the inlet ports 36, 46 of normally open 3-way valves 38, 48. Valve 38 passes the pressurized fluid to driven wheel brake wheel cylinder of wheel 42. Valve 48 passes pressurized fluid through a conventional proportioning valve 52 to the non-driven wheel brake cylinder of wheel 54. Decay valves 39, 49 are 2-way solenoid actuated valves and are normally closed such that they normally block the passage of pressurized fluid from outlet ports 41, 43 of valves 38, 48 to the inlet port 110 of pump 60. Similarly normally closed valve 64 blocks pressurized brake fluid in wheel cylinder of wheel 42 from returning to master cylinder chamber 16 when energized if the pressure at wheel cylinder 42 is higher than that at master cylinder 16. When de-energized, at valve 64 functions similar to check valve 66 normally permits pressurized fluid at wheel cylinder 54 to return to master cylinder chamber 16 but this valve operates only when the master cylinder is released such that the pressure in chamber 16 drops below the pressure at the wheel cylinder of wheel 54.

During anti-lock braking, the isolation/build 3-way valve 32 is energized thereby isolating wheel cylinder of wheels 42, 54 from master cylinder 12 and simultaneously connecting same to the output 120 of pump 60. Modulation of braking pressure by the wheel cylinders of wheels 42, 54 is effected in normal fashion by selective operation of the build/hold valves 38, 48 and decay valves 39, 49. Under these conditions, valve 70 remains normally closed such that fluid is blocked from entering the pump 60 via port 114. With specific reference to FIG. 2, it will further be observed that when the pressure in fluid passage 90, which corresponds to the pressure at wheel cylinders of wheels 42, 54, is less than the pressure exerted by the spring 84, ball valve 100 remains closed and the pump is effectively inoperative. However, if the pressure appearing at inlet port 110 is geater than the pressure exerted by the spring 84, the pump 60 will begin to pump pressurized brake fluid through its outlet port 120. This pressurized fluid charges accumulator 62 and provides for replenishment of braking fluid lost from cylinder 16 during decay cycles of the antilock operation. Operation of the pump 60 is effected by means of the anti-lock braking system control, such control is being well known in the art and not being shown in the drawing for clarity. Actual replenishment of the fluid depleted from cylinder 16 is under the control of the isolation/build 3-way solenoid actuated valve 32. Replenishment prior to fluid for these cylinders of wheels 42, 54 passes via decay valves 39, 49 to the sump 56 or directly to the pump primary inlet port 110.

During conditions when traction control is required, and appropriate signal from the control system (not shown) effects operation of solenoid valves 64, 70, 34, 38, 39 and 48. Valve 70 connects pump inlet port 114 directly to the master cylinder reservoir 22 thereby providing a supply of brake fluid to the pump 60. Valves 38, 39, and 70 connecting driven wheel cylinder 42 to accumulator pressure 62 and sump 56 can now modulate the application of braking force to the driven wheel to effect traction control as required application of pressure is effected through valve 32 and 38. Release of braking pressure is effected back through the valve 38 and decay valve 39 to pump inlet port 110 into sump 56 to provide for replenishment of depleted brake fluid as in anti-lock operation.

From the above description, it will be seen that the novel pump and wheel slip control system disclosed provide a simple and direct means for providing traction control operation based upon an anti-lock braking system of the pump-back type. The system requires the addition of two solenoid actuated valves 64 and 70 for each control channel and modification of the pump 60 to provide dual operation both as a replenishment pump in response to pressurized fluid in its inlet port 110 and a non-pressurized supply at its inlet port 114 during traction control. The system is applicable to two and four-wheel drive vehicles.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. In a wheel slip control system comprising speed sensor means operatively connected to the wheels of a vehicle for generating a signal as a function of the rotation thereof, control means responsive to the rotational behavior of the wheels for generating control signals in response to wheel slip, means including a master cylinder and at least one wheel brake cylinder for applying braking force to said wheels, brake pressure modulating means for automatically modulating the application of braking force to said wheels in response to said control signals, the improvement wherein said modulator means includes pump means operable in a first state to pump braking fluid from a first source and operable in a second state to draw and pump fluid from a second source, first valve means operable in response to a traction control signal for blocking communication from said wheel cylinder to said master cylinder and providing communication therebetween in the absence of said traction control signal, and second valve means for connecting said pump means to said second source in response to said traction control signal and blocking communication therebetween in the absence of said traction control signal.

2. The system of claim 1 wherein said pump means includes a piston chamber and a piston reciprocal therein, said piston including pressure responsive valve means connecting said piston chamber to said first source for admitting fluid to said piston chamber in response to a predetermined pressure of said fluid.

3. The system of claim 2 wherein said pump means includes fluid port means for connecting said piston chamber to said second valve means, said piston chamber being connected to said second source in response to operation of said second valve means.

4. The system of claim 2 wherein said pressure responsive valve means includes a chamber axially disposed in said piston and having an open end communicating with said piston chamber, a fluid port communicating between said chamber and aid first source in all positions of said piston, a valve element, and means resiliently maintaining the said valve element in a position closing said open end of said chamber, said valve element being operable to a position opening said chamber to said a piston chamber in response to pressurized fluid in said chamber and being closed in the absence thereof.

5. The system of claim 4 wherein said fluid port communicates with said piston chamber in a position wherein said port is open when said piston is at the bottom of its stroke and is closed by said piston when said piston is displaced from the bottom of it stroke.

6. The system of claim 1 wherein said first valve means is a normally closed 2-way solenoid actuated valve connected hydraulically in series between the wheel cylinder of said vehicle associated with a driven wheel and one pressure chamber of said master cylinder.

7. The system of claim 6 wherein said second valve means is a normally closed 2-way solenoid actuated valve connected hydraulically in series between said fluid port and the reservoir of said master cylinder.

8. The system of claim 7 wherein said master cylinder has two hydraulically isolated pressure chambers, said pump including two said pistons, two said fluid ports, and two said first valve means, one each of said pistons, fluid ports, and first valve means being associated with a different one of the different wheels of said vehicle.

9. The system of claim 8 wherein said pump is responsive to a predetermined depletion of braking fluid in said master cylinder pressure chambers to pump fluid thereinto.

10. The system of claim 9 wherein there is a piston, a first valve means, and a fluid port associated with each drive wheel of said vehicle.

* * * * *